United States Patent
Kuntz et al.

(10) Patent No.: US 10,489,235 B2
(45) Date of Patent: Nov. 26, 2019

(54) ANALYSIS METHOD OF EMBEDDED SYSTEM DYSFUNCTIONS, ASSOCIATED COMPUTER PROGRAM PRODUCT AND ANALYSIS DEVICE

(71) Applicant: Thales, Courbevoie (FR)

(72) Inventors: Fabien Kuntz, Toulouse (FR);
Christian Sannino, Toulouse (FR);
Jonathan Sprauel, Toulouse (FR)

(73) Assignee: THALES, Courbevoie (FR)

( * ) Notice: Subject to any disclaimer, the term of this patent is extended or adjusted under 35 U.S.C. 154(b) by 221 days.

(21) Appl. No.: 15/694,856

(22) Filed: Sep. 4, 2017

(65) Prior Publication Data
US 2018/0081748 A1    Mar. 22, 2018

(30) Foreign Application Priority Data
Sep. 20, 2016 (FR) ..................... 16 01367

(51) Int. Cl.
*G06F 11/00* (2006.01)
*G06F 11/07* (2006.01)
*G06N 5/02* (2006.01)

(52) U.S. Cl.
CPC ........ *G06F 11/079* (2013.01); *G06F 11/0736* (2013.01); *G06N 5/022* (2013.01)

(58) Field of Classification Search
CPC .............. G06F 11/079; G06F 11/0739; G06F 11/0796; G06F 11/3013; G06F 11/3447; G06F 11/3452; G06F 11/0736; G06F 11/0754; G06N 5/045; G06N 5/022
See application file for complete search history.

(56) References Cited

U.S. PATENT DOCUMENTS

| | | | |
|---|---|---|---|
| 6,519,552 B1* | 2/2003 | Sampath | G05B 23/0254 702/183 |
| 2006/0235650 A1* | 10/2006 | Vinberg | G06F 11/3447 702/182 |
| 2013/0190095 A1* | 7/2013 | Gadher | G06F 11/008 463/42 |
| 2014/0372803 A1 | 12/2014 | Park et al. | |

FOREIGN PATENT DOCUMENTS

| | | | |
|---|---|---|---|
| FR | 3003663 A1 | 9/2014 | |
| FR | 3029239 A1 | 6/2016 | |

OTHER PUBLICATIONS

French Patent Application No. 16 01367, INPI Rapport de Recherche Préliminaire, dated Jun. 13, 2017, 3 pages.

* cited by examiner

*Primary Examiner* — Joseph D Manoskey
(74) *Attorney, Agent, or Firm* — Soquel Group LLC

(57) ABSTRACT

A method for analyzing dysfunctions of an embedded system including a phase for modeling this system and an analysis phase, the modeling phase including defining a set of resources, a set of services, a set of statuses and at least one rule for the acquisition of a status by a resource or by a service, the analysis phase including configuring the analysis including marking a marked event and analyzing acquisition rules to determine a set of basic events and conditions for the appearance thereof, leading to the appearance of the marked basic event.

14 Claims, 2 Drawing Sheets

ANALYSIS METHOD OF EMBEDDED SYSTEM DYSFUNCTIONS, ASSOCIATED COMPUTER PROGRAM PRODUCT AND ANALYSIS DEVICE

CROSS REFERENCE TO RELATED APPLICATIONS

This application claims priority under 35 USC § 119 of French Patent Application No. 16 01367 filed on Sep. 20, 2016.

FIELD OF THE INVENTION

The present invention relates to an analysis method of embedded system dysfunctions, and an associated computer program product and analysis device.

BACKGROUND OF THE INVENTION

In a manner known in itself, the analysis of dysfunctions of an embedded system, and in particular an avionics system, is done based on different analysis domains of these dysfunctions.

The analysis of the dysfunctions by these different domains has different purposes and is generally done independently for each of the domains.

These domains in particular include the diagnostic analysis domain, making it possible to identify the origin of appearance of an error message in an embedded system; the operating safety analysis domain, making it possible to analyze risks of the appearance of failure conditions; the safety analysis domain, making it possible to analyze consequences of the appearance of malevolent acts; and the operating warning analysis domain, making it possible to determine warnings indicating one or several dysfunctions of the system.

The analysis of dysfunctions based on at least some of the aforementioned domains is often done using so-called model-based reasoning techniques.

These techniques consist of the depiction of the analyzed system in the form of a formal model, then the automated analysis of the system using the formal model.

Thus for example, to analyze dysfunctions according to the diagnostic analysis domain, models are frequently used that describe the analyzed system in terms of components and interconnections. A reasoning engine is next implemented to perform diagnostic calculations from the models.

For the operating safety analysis domain, models are frequently used incorporating a fault tree. Such a tree graphically shows the possible combinations of events, and in particular of dysfunctions, that may lead to the appearance of a failure condition.

For the safety analysis domain, processing methods similar to those of the operating safety analysis domain can be used. Indeed, both domains analyze failure conditions, except that for the safety analysis domain, it involves failure conditions caused by malevolent acts, and the operating safety domain, it involves failure conditions caused by failures. Thus, it is for example possible to use fault trees similar to those previously mentioned to analyze dysfunctions according to the safety analysis domain.

One can then see that the analysis of dysfunctions according to different domains requires a special adaptation for each of the domains. This adaptation may sometimes be cumbersome. It is often necessary to build a specific model for each of the domains, which presents a major difficulty in analyzing dysfunctions of an embedded system.

SUMMARY OF THE DESCRIPTION

The present invention aims to propose a method for analyzing dysfunctions of an embedded system making it possible to analyze the dysfunctions of the system particularly simply, without a specific adaptation to a particular analysis domain being necessary.

To that end, the invention relates to a method for analyzing dysfunctions of an embedded system comprising a phase for modeling this system and an analysis phase.

The modeling phase comprising the following steps:
defining a set of resources forming the embedded system, and for each defined resource, defining a set of services provided or consumed by this resource;
for each resource and for each service, defining a set of statuses, each status being able to be acquired by the corresponding resource or by the corresponding service to characterize the operating state of this resource or the quality of service of this service, the acquisition by a resource or by a service of one of the statuses from the corresponding set of statuses constituting a basic event;
for each status of at least one resource or at least one service, defining a rule for the acquisition of this status by this resource or by this service based on a status acquired by at least one other resource or service.

The analysis phase comprising the following steps:
configuring the analysis, comprising the selection of a basic event, called marked basic event;
analyzing the rules for the acquisition and determination of the set of basic events and conditions for the appearance thereof, leading to the appearance of the marked basic event, and associating at least some basic events with dysfunctions of the embedded system.

According to other advantageous aspects of the invention, the analysis method comprises one or more of the following features, considered alone or according to all technically possible combinations:
the analysis of the acquisition rules comprises implementing an algorithm for calculating minimum cuts;
the conditions for the appearance of basic events comprise conjunction, disjunction and negation logic operations between various basic events;
the configuring step further comprises associating a numerical value with at least one basic event corresponding to the probability of appearance of this basic event;
the step for determining a set of basic events and conditions for the appearance thereof further comprises calculating the probability of appearance of the marked basic event;
the configuring step further comprises associating a numerical value with the marked basic event corresponding to the maximum acceptable probability of appearance of this marked basic event;
the step for determining a set of basic events and conditions for the appearance thereof further comprises comparing the maximum acceptable probability of appearance of the marked basic event to the calculated probability of appearance of the marked basic event;
the configuring step is carried out based on a dysfunction analysis domain of the embedded system, each domain being chosen from the group consisting of: a diagnostic analysis domain, making it possible to identify the origin of appearance of an error message in the embedded system; an operating safety analysis domain, making it possible to analyze risks of the appearance of failure conditions; a safety analysis domain, making it possible to analyze consequences of the appearance of malevolent acts; and an operating warning analysis domain, making it possible to determine warnings indicating one or several dysfunctions of the embedded system;

each marked basic event corresponds to one of the elements chosen from the group consisting of: the appearance of an error message, the appearance of a failure condition, and the appearance of a warning.

The invention also relates to a computer program product including software instructions which, when implemented by computer equipment, carry out the method as defined above.

The invention also relates to a device for analyzing dysfunctions of an embedded system implementing the analysis method as defined above.

The following definitions are employed throughout the specification.

DEFECT refers to an anomaly in the operation of the embedded system or one of its components.

DYSFUNCTION refers to any event having occurred in the embedded system or in one of its components that prevents the normal operation of the system or one of these components. In particular, a dysfunction corresponds to one of the elements chosen from the group consisting of: a defect, a malevolent act, a failure and a failure condition.

ERROR MESSAGE or SYNOPTIC REPORT refers to any message generated by the embedded system or one of its components that is intended to report a dysfunction having occurred in this system or one of these components. Such a message is in particular intended for an analysis or recording system for this dysfunction.

FAILURE refers to the effect of one or several defects and/or one or several malevolent acts on the operation of the embedded system or one of its components.

FAILURE CONDITION refers to a critical failure; i.e., a failure that has critical consequences on the operation of the embedded system or one of its components.

MALEVOLENT ACT refers to any intrusion into the embedded system or one of its components intended to harm the normal operation of the system or one of its components.

OPERATING WARNING refers to any text, voice or other message intended to report, to an operator using the embedded system, a dysfunction having occurred in this system or one of its components. Such a message is for example generated by a warning system.

BRIEF DESCRIPTION OF THE DRAWINGS

These features and advantages of the invention will appear upon reading the following description, provided solely as a non-limiting example, and done in reference to the appended drawings, in which.

DETAILED DESCRIPTION

Figure 1:
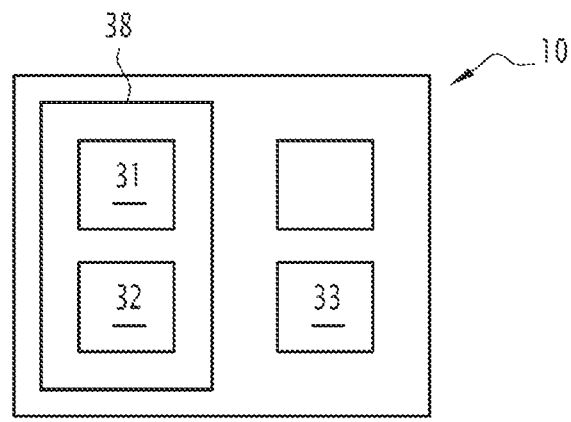
FIG. 1 is a schematic view of an analysis device according to the invention, the analysis device carrying out an analysis method according to the invention making it possible to analyze dysfunctions of an embedded system.
Figure 2:
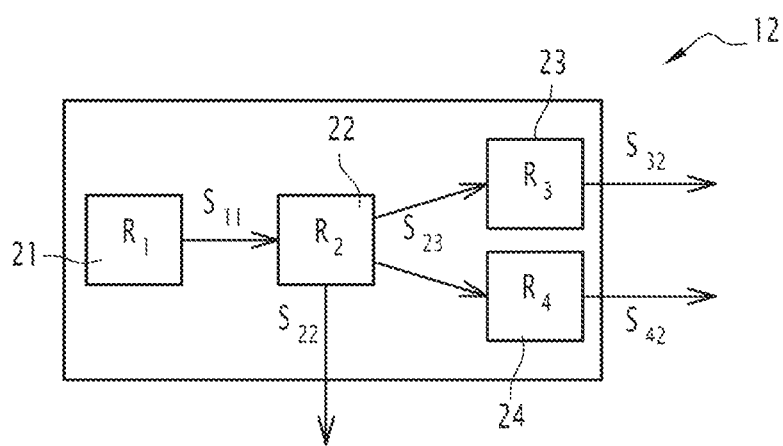
FIG. 2 is a schematic view of the embedded system of FIG. 1.

The analysis device 10 of FIG. 1 makes it possible to analyze dysfunctions of an embedded system 12 illustrated in more detail in FIG. 2.

The embedded system 12 is for example an avionics system of an aircraft, such as a heating system.

The embedded system 12 comprises a plurality of hardware and/or software components. Each of these components has a predetermined purpose in the operation of the system 12.

It should be noted that at least some of the components of the system 12 can be used by other embedded systems.

In the example of FIG. 2, the embedded system 12 includes a power supply 21, a heater 22, a maintenance system 23 and a flight warning system 24.

According to this example, the maintenance system 23 and the flight warning system 24 can be used by other embedded systems that are not illustrated by FIG. 2 and will not be described later.

The power supply 21 is able to supply electrical current to the heater 22.

The heater 22 is able to use this electrical current to produce heat for example intended for the cabin of the aircraft.

The heater 22 is further able to produce an error message when heat cannot be supplied. This message is intended for the maintenance system 23 and the flight warning system 24.

Each of the maintenance system 23 and the flight warning system 24 is able to receive the error message sent by the heater 22.

In particular, the maintenance system 23 is able, if such an error message is received, to generate a maintenance message intended for a maintenance operator.

Similarly, the flight warning system 24 is able, if such an error message is received, to generate a warning intended for the crew of the aircraft.

In reference to FIG. 1, the analysis device 10 includes a modeling module 31, an analysis module 32 and a communication module 33.

The modeling module 31 makes it possible to model the operation of the embedded system 12 by carrying out a modeling phase PM of the analysis method that will be explained in more detail below.

The analysis module 32 makes it possible to analyze dysfunctions of the system 12 by carrying out an analysis phase PA of the analysis method.

The display module 33 for example has a man-machine communication interface allowing a user to communicate with the analysis device 10. In a manner known in itself, such an interface for example comprises a display screen and means for introducing information, such as a keyboard.

The analysis device 10 is for example a computer further including a memory 38 and a processor 39. In this case, the modeling 31 and analysis 32 modules assume the form of software programs stored in the memory 38 and implemented by the processor 39.

Figure 3:
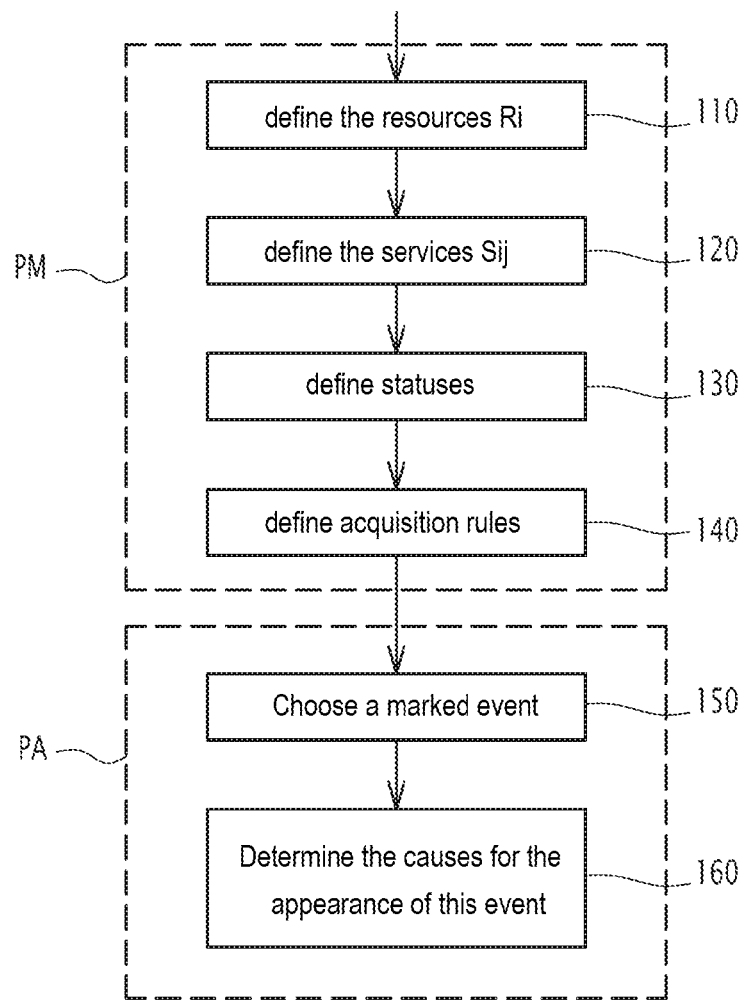
FIG. 3 is a flowchart of the analysis method of FIG. 1.

The analysis method according to the invention will now be explained in reference to FIG. 3, showing a flowchart of its steps.

As previously mentioned, the analysis method according to the invention comprises a modeling phase PM and an analysis phase PA.

During the initial step 110 of the modeling phase PM, the modeling module 31 defines a set of resources R forming the embedded system 12. Each resource $R_i$ corresponds to a component of the system 12 as previously defined.

In the notation of the type "$R_i$", the index associated with the letter "R" corresponds to a unique identifier of the corresponding resource in the system 12 and varies for example from 1 to N, N being a natural number designating the total number of resources in the system 12.

Thus, in the example embodiment of FIG. 2, during this step 110, the modeling module 31 defines four resources $R_1$, $R_2$, $R_3$ and $R_4$, respectively, corresponding to the power supply 21, the heater 22, the maintenance system 23 and the flight warning system 24.

During the following step 120, the modeling module 31 defines, for each resource $R_i$, a set of services $S_{ij}$ supplied or consumed by this resource $R_i$.

Each service $S_{ij}$ supplied by a resource $R_i$ thus has a result of the operation of this resource $R_i$ in the system 12.

Each service $S_{ij}$ consumed by a resource $R_i$ thus has a service $S_{nm}$ supplied by another resource $R_i$ and used by this resource $R_i$ to supply another service $S_{ik}$.

In the notation of the type "$S_{ij}$", the first index associated with the letter "S" refers to the identifier of the resource $R_i$ supplying or consuming the corresponding service, and the second index associated with the letter "S" corresponds to a unique identifier of the corresponding service from among all of the services supplied or consumed by the resource $R_i$. The second index for example varies from 1 to M, the number M being a natural number designating the total number of services supplied by the resource $R_i$.

In the example embodiment of FIG. 2, during this step 120, for the resource $R_1$, the modeling module 31 defines a service $S_{11}$ supplying electrical current.

For the resource $R_2$, the modeling module 31 defines a service $S_{21}$ corresponding to the consumption by this resource of the electrical current supplied by the resource $R_1$, a service $S_{22}$ corresponding to the production of heat, and a service $S_{23}$ corresponding to the production of an error message when the heat cannot be supplied.

For each of the resources $R_3$ and $R_4$, the modeling module 31 defines a service $S_{31}$ and a service $S_{41}$, respectively, corresponding to the consumption of an error message produced by the resource $R_2$.

For the resource $R_3$, the modeling module 31 further defines a service $S_{32}$ corresponding to the production of a maintenance message.

Lastly, for the resource $R_4$, the modeling module 31 further defines a service $S_{42}$ corresponding to the production of a warning.

It should be noted that only the services $S_{11}$, $S_{22}$, $S_{23}$, $S_{32}$ and $S_{42}$ supplied by the resources $R_1$ to $R_4$ are illustrated in FIG. 2.

It should also be noted that the list of services $S_{ij}$ mentioned above in connection with the resources $R_1$ to $R_4$ is not exhaustive.

During the following step 130, the modeling module 31 defines, for each resource $R_i$ and for each service $S_{ij}$, a set of statuses.

In particular, the set of statuses associated with a resource $R_i$ is made up of several statuses, each status of which is able to characterize the operating state of this resource $R_i$ at a given moment.

Each resource $R_i$ is therefore able to acquire one of the statuses of the corresponding set of statuses such that its operating state is characterized by this status at a given moment.

In the example embodiment of FIG. 2, the modeling module 31 defines, for each of the resources $R_2$ to $R_4$, a set of statuses made up of two statuses; i.e., "OK" and "KO".

The "OK" status defines the operating state of the corresponding resource $R_2$ to $R_4$ in which it operates normally. The "KO" status defines the operating state of the corresponding resource $R_2$ to $R_4$ in which it is faulty.

For the resource $R_1$, the modeling module 31 defines a set of statuses made up of three statuses, i.e., "OK", "KO" and "Surcharged". The "OK" and "KO" statuses characterize the same operating states of the resource $R_1$ as in the case of the resources $R_2$ to $R_4$. The "Surcharged" status characterizes the operating state of the resource $R_1$ in which it is surcharged.

For the services $S_{ij}$, the set of statuses associated with a status $S_{ij}$ is made up of several statuses, each status of which is able to characterize the service quality of this service $S_{ij}$ at a given moment.

Each service $S_{ij}$ is therefore able to acquire one of the statuses of the corresponding set of statuses such that its service quality is characterized by this status at a given moment.

Thus, in the example embodiment of FIG. 2, during step 130, the modeling module 31 defines, for the services $S_{11}$ and $S_{21}$ respectively corresponding to the production and consumption of an electrical current, a set of statuses made up of two statuses, i.e., "None" and "Full". The "None" status means that the electrical current is not produced. The "Full" status means that the electrical current is produced normally.

For the service $S_{22}$ corresponding to heat production, the modeling module 31 defines a set of statuses made up of two statuses, i.e., "Available" and "Not Available". The "Available" status means that heat is produced, and the "Not Available" status means that heat is not produced.

Lastly, for each of the services $S_{23}$, $S_{31}$, $S_{32}$, $S_{41}$ and $S_{42}$ corresponding to the production or consumption of a message, the modeling module 31 defines a set of statuses made up of two statuses, i.e., "Sent" and "Not Sent". The "Sent" status means that the corresponding message has been sent or received, and the "Not Sent" status means that the corresponding message has not been sent or received.

In the rest of the description, "basic event" refers to the acquisition, by a resource $R_i$ or by a service $S_{ij}$, of one of the statuses from the set of statuses corresponding to this resource $R_i$ or this service $S_{ij}$.

One can then see that at least some basic events correspond, for example, to dysfunctions of the system 12 or one of its components. Thus, for example, the acquisition of the "KO" status by the resource $R_1$ corresponds to a defect having occurred in this resource and the acquisition of the "Surcharged" status by the same resource corresponds to a malevolent act having occurred with respect to this resource.

During the following step 140, the modeling module 31 defines, for each status of each resource $R_i$ and each service $S_{ij}$, at least one rule for the acquisition of this status by this resource $R_i$ or by this service $S_{ij}$ based on a status acquired by at least one other resource $R_i$ or service $S_{ij}$.

The acquisition rules therefore define dependencies between the statuses of different resources $R_i$ and different services $S_{ij}$.

Thus, in the example of FIG. 2, the modeling module 31 for example defines a rule for acquiring the "None" status of the service $S_{11}$ according to which the service $S_{11}$ acquires this "None" status when the resource $R_1$ acquires the "KO" status.

In the same example, the modeling module 31 for example defines a rule for acquiring the "Available" status of the service $S_{22}$ according to which this service $S_{22}$ acquires this "Available" status when the service $S_{21}$ acquires the "Full" status and the resource $R_2$ acquires the "OK" status.

Of course, many other acquisition rules can be defined in the example of FIG. 2.

Step 140 is a final step of the modeling phase PM. At the end of this step, a model of the system 12 is therefore obtained.

It should be noted that each of the definition steps 110 to 140 previously described can be implemented by using a corresponding database that is for example stored in the memory 38 of the device 10.

Thus, these databases in particular include a list of resources $R_i$ for the system 12, a list of services $S_{ij}$ for each of the resources $R_i$, a list of sets of statuses for each of the resources $R_i$ and for each of the services $S_{ij}$, and a list of rules for acquiring at least some of the statuses.

These databases are for example introduced by a user before carrying out the corresponding steps or are provided by the producer of the embedded system 12.

After the modeling phase PM, the analysis device 10 carries out the phase PA for analyzing dysfunctions of the system 12 using the model of the system 12.

During the initial step 150 of this phase, the analysis phase 32 acquires data to configure the analysis.

These data are for example introduced by the user via the communication module 33 and make it possible to mark a basic event, called marked basic event hereinafter.

The marked event for example represents a dysfunction of the embedded system 12 or, on the contrary, the acquisition by a resource $R_i$ of the "OK" status.

The marked basic event is chosen by the user of the device 10 based on the dysfunction analysis domain of the embedded system 12.

Each analysis domain is chosen from the group comprising:
- diagnostic analysis domain, making it possible to identify the origin of appearance of an error message in the embedded system 12;
- operating safety analysis domain, making it possible to analyze risks of the appearance of failure conditions;
- safety analysis domain, making it possible to analyze consequences of the appearance of malevolent acts; and
- operating warning analysis domain, making it possible to determine warnings indicating one or several dysfunctions of the system 12.

Thus, for the diagnostic analysis domain, the marked basic event corresponds to the appearance of an error message in the embedded system 12 following one or several malfunctions having occurred in this system 12 or in one of its components. The aim of the analysis of this marked basic event by the device 10 therefore consists of identifying all of the causes of the appearance of such an error message in the embedded system 12. These causes correspond to dysfunctions of the system 12 and conditions for the appearance of these dysfunctions.

In the example embodiment of FIG. 2, such a marked basic event corresponds to the acquisition of the "Sent" status by one of the services $S_{23}$, $S_{31}$, $S_{32}$ or $S_{41}$.

For the operating warning analysis domain, the marked basic event corresponds to the appearance of a warning in particular emitted by the flight warning system 24 following one or several malfunctions having occurred in this system 12 or in one of its components. The aim of the analysis of this marked basic event by the device 10 therefore consists of identifying all of the causes of the appearance of such a warning. These causes correspond to dysfunctions of the system 12 and conditions for the appearance of these dysfunctions.

In the example embodiment of FIG. 2, such a marked basic event corresponds to the acquisition of the "Sent" status by the service $S_{42}$.

For the operating safety analysis domain, the marked basic event corresponds to the appearance of a failure condition. The aim of the analysis of this marked basic event by the device 10 therefore consists of identifying all of the causes of the appearance of such a failure condition and analyzing the risks of the appearance of this failure condition. These causes correspond to dysfunctions of the system 12 and conditions for the appearance of these dysfunctions.

To accompany the marked basic events corresponding to the safety analysis domain, two types of numerical data are configured.

The numerical data of a first type correspond to the maximum acceptable probability for the appearance of the critical failure. These data are for example associated in the form of a numerical argument with the marked basic event corresponding to the appearance of the critical failure, and more particularly to the status acquired by a resource $R_i$ or a service $S_{ij}$.

The numerical data of a second type correspond to probabilities of the appearance of malfunctions of one of the components of the embedded system 12. These data are for example associated with basic events corresponding to the appearance of these dysfunctions. In particular, each of these data is associated with the status acquired by a resource $R_i$ or a service $S_{ij}$ depending on the corresponding basic event.

In the example embodiment of FIG. 2, such a marked basic event corresponds to the acquisition of the "Not Available" status by the service $S_{22}$.

In this case, an argument "1E-4" corresponding to a datum of the first type is associated with this status, which means that the maximum acceptable probability for the appearance of a dysfunction of the heater 22 is equal to $10^{-4}$.

Furthermore, arguments "1E-5" and "1E-6" corresponding to data of the second type are associated with the "KO" statuses of the resources $R_2$ and $R_1$, respectively. This then means that the dysfunction probabilities (also called failure rates) of the heater 22 and the power supply 21 are respectively equal to $10^{-5}$ and $10^{-6}$.

For the safety analysis domain, the marked basic event corresponds to the appearance of a failure condition due to one or several malevolent acts having occurred in the embedded system 12 or in one of its components.

Similarly to the operating safety analysis domain, to accompany the marked basic events corresponding to the safety analysis domain, two types of numerical data are configured.

As in the previous case, the numerical data of a first type correspond to the maximum acceptable probability for the appearance of the critical failure following the appearance of one or several malevolent acts. These data are for example associated in the form of a numerical argument with the marked basic event corresponding to the appearance of this failure condition, and more particularly to the status acquired by a resource $R_i$ or a service $S_{ij}$ depending on the marked basic event.

The numerical data of a second type correspond to probabilities of the appearance of malevolent acts in the embedded system 12. These data are for example associated with basic events corresponding to the appearance of these acts. In particular, each of these data is associated with the status acquired by a resource $R_i$ or a service $S_{ij}$ depending on the corresponding basic event.

In the example embodiment of FIG. 2, such a marked basic event corresponding to the safety analysis domain comprises, as in the previous case, the acquisition of the "Not Available" status by the service $S_{22}$.

In this case, an argument "1E-4" corresponding to a datum of the first type is associated with this status, which means that the maximum acceptable probability for the appearance of a failure condition relative to this the heater 22 and due to one or several malevolent acts, is equal to $10^{-4}$.

Furthermore, an argument "1E-7" corresponding to a datum of a second type is assigned the "Surcharged" status of the resource $R_2$. This then means that the threat potential corresponding to a malevolent surcharge of the power supply 21 is equal to $10^{-7}$.

According to one example embodiment, the configuration data make it possible to define several marked basic events corresponding to a same analysis domain or to different analysis domains.

During the following step 160, the analysis module 32 analyzes all of the acquisition rules defined during step 140 and determines all of the causes for the appearance of the marked basic event. These causes in particular correspond to the appearance of one or several basic events as well as conditions for their appearance.

In particular, during this step 160, the analysis module 32 implements an algorithm for calculating minimum cuts, known in itself. This algorithm in particular comprises creating fault trees from the model of the embedded system 12 obtained during the modeling phase PM and analyzes these trees based on the analysis domain corresponding to the marked basic event.

The algorithm for calculating minimum cuts then makes it possible to obtain all of the basic events and conditions for the appearance thereof, leading to the appearance of the marked basic event.

The conditions for the appearance of the different basic events for example comprise logic operations of the "AND", "OR" and "NO" type corresponding to the conjunction, disjunction and negation, respectively, of different basic events.

For the diagnostic analysis domain, the determined basic events and the conditions for their appearance make it possible to identify the origin of the appearance of the message.

Thus, in the example of FIG. 2, the marked basic event corresponding to the acquisition of the "Sent" status by the service $S_{31}$ is obtained following the following basic events and conditions for their appearance:

basic event corresponding to the acquisition of the "Surcharged" status by the resource $R_1$; OR basic event corresponding to the acquisition of the "KO" status by the resource $R_1$; OR basic event corresponding to the acquisition of the "KO" status by the resource $R_2$.

The first basic event constitutes a malevolent act having occurred in the resource $R_1$, and the second and third basic events constitute failures having occurred in the resource $R_1$ and the resource $R_2$, respectively.

For the operating warning analysis domain, the determined basic events and the conditions for their appearance make it possible to identify the origin of the appearance of a warning.

Thus, in the example of FIG. 2, the marked basic event corresponding to the acquisition of the "Sent" status by the service $S_{42}$ is obtained following the following basic events and conditions for their appearance:

basic event corresponding to the acquisition of the "Surcharged" status by the resource $R_1$; OR basic event corresponding to the acquisition of the "KO" status by the resource $R_1$; OR basic event corresponding to the acquisition of the "KO" status by the resource $R_2$.

As in the previous case, the first basic event constitutes a malevolent act having occurred in the resource $R_1$, and the second and third basic events constitute failures having occurred in the resource $R_1$ and the resource $R_2$, respectively.

For the operating safety analysis domain, the determined basic events and the conditions for their appearance make it possible to identify the origin of the appearance of a failure condition.

For this domain, the analysis module further calculates the maximum probability of reaching the failure condition and compares this probability to the maximum acceptable probability of the appearance of the failure condition.

Thus, in the example of FIG. 2, the marked basic event corresponding to the acquisition of the "Not Available" status by the service $S_{22}$ is obtained following the basic event corresponding to the acquisition of the "KO" status by the resource $R_1$, with a maximum probability equal to $10^{-5}$, which is lower than the maximum acceptable probability for the appearance of this marked basic event, which was set at $10^{-4}$.

The basic event corresponding to the acquisition of the "KO" status by the resource $R_1$ constitutes a failure having occurred in this resource $R_1$.

Similarly, for the safety analysis domain, the determined basic events and the conditions for their appearance make it possible to identify one or several malevolent acts causing a failure condition.

For this domain, the analysis module 32 further calculates the maximum probability of the appearance of the failure condition following the determined malevolent act(s) and compares this probability to the maximum acceptable probability of the appearance of this act.

Thus, in the example of FIG. 2, the marked basic event corresponding to the acquisition of the "Not Available" status by the service $S_{22}$ is obtained following the basic event corresponding to the acquisition of the "Surcharged" status by the resource $R_1$, with a maximum probability equal to $10^{-7}$, which is lower than the maximum acceptable probability for the appearance of this marked basic event, which was set at $10^{-4}$.

The basic event corresponding to the acquisition of the "Surcharged" status by the resource $R_1$ constitutes a malevolent act having occurred in this resource $R_1$.

When the configuration data comprise data relative to several marked basic events, during step 160, the analysis module determines a set of basic events and conditions for their appearance, leading to the appearance of each of these marked basic events.

At the end of step 160, the analysis module 32 sends the results obtained during this step, i.e., a list of basic events, the conditions for their appearance and, optionally, a probability of appearance of the marked basic event, to the user, for example via the communication module 33.

One can then see that the invention has a certain number of advantages.

Indeed, the modeling phase implemented by the analysis method is independent of the analysis domain according to which the dysfunctions of the embedded system must be processed.

This has been achieved owing to the introduction of universal notions that are shared for all of the analysis domains. Thus, the model of the system obtained at the end of the modeling phase can be used to analyze the dysfunctions of the system according to any analysis domain.

The analysis phase of this method makes it possible to specify the desired analysis domain particularly simply.

Thus, to do this, during a configuration step, the user marks a basic event that corresponds to one of the domains.

This step further makes it possible to define numerical data for example corresponding to the maximum acceptable probability of appearance of this marked basic event and the maximum probability of appearance of any other basic event.

Lastly, the final step of the analysis phase implements an algorithm for calculating minimum cuts that makes it possible to determine all of the causes for appearance of the marked basic event, independently of the considered analysis domain.

The invention claimed is:

1. A method for analyzing dysfunctions of an embedded system comprising a modeling phase for modeling the embedded system and an analysis phase, the modeling phase comprising:
defining a set of resources forming the embedded system, and for each defined resource, defining a set of services provided or consumed by this resource;
for each resource and for each service, defining a set of statuses, each status being able to be acquired by the corresponding resource or by the corresponding service to characterize the operating state of this resource or the quality of service of this service, the acquisition by a resource or by a service of one of the statuses from the corresponding set of statuses constituting a basic event; and
for each status of at least one resource or at least one service, defining a rule for the acquisition of this status by this resource or by this service based on a status acquired by at least one other resource or service; and the analysis phase comprising:
configuring the analysis, comprising selecting a basic event, called a marked basic event;
analyzing the rules for the acquisition, comprising implementing an algorithm for calculating minimum cuts;
determining the set of basic events and conditions for the appearance thereof, leading to the appearance of the marked basic event; and
associating at least some basic events with dysfunctions of the embedded system.

2. The method according to claim 1, wherein the conditions for the appearance of basic events comprise conjunction, disjunction and negation logic operations between various basic events.

3. The method according to claim 1, wherein said configuring comprises associating a numerical value with at least one basic event corresponding to the probability of appearance of this basic event.

4. The method according to claim 3, wherein said determining the set of basic events and conditions for the appearance thereof comprises calculating the probability of appearance of the marked basic event.

5. The method according to claim 1, wherein said configuring comprises associating a numerical value with the marked basic event corresponding to the maximum acceptable probability of appearance of this marked basic event.

6. The method according to claim 4, wherein said determining a set of basic events and conditions for the appearance thereof comprises comparing the maximum acceptable probability of appearance of the marked basic event to the calculated probability of appearance of the marked basic event.

7. The method according to claim 1, wherein said configuring is carried out based on an analysis domain of dysfunctions of the embedded system, each domain being chosen from the group consisting of:
diagnostic analysis domain, making it possible to identify the origin of appearance of an error message in the embedded system,
operating safety analysis domain, making it possible to analyze risks of the appearance of failure conditions,
safety analysis domain, making it possible to analyze consequences of the appearance of malevolent acts, and
operating warning analysis domain, making it possible to determine warnings indicating one or several dysfunctions of the embedded system.

8. The method according to claim 1, wherein each marked basic event corresponds to one of the elements chosen from the group consisting of the appearance of an error message, the appearance of a failure condition, and the appearance of a warning.

9. A non-transient computer-readable storage medium, having stored thereon software instructions which, when implemented by a piece of computer equipment, carry out the method according to claim 1.

10. An analysis device for dysfunctions of an embedded system carrying out the analysis method according to claim 1.

11. A method for analyzing dysfunctions of an embedded system comprising a modeling phase for modeling the embedded system and an analysis phase, the modeling phase comprising:
defining a set of resources forming the embedded system, and for each defined resource, defining a set of services provided or consumed by this resource;
for each resource and for each service, defining a set of statuses, each status being able to be acquired by the corresponding resource or by the corresponding service to characterize the operating state of this resource or the quality of service of this service, the acquisition by a resource or by a service of one of the statuses from the corresponding set of statuses constituting a basic event; and
for each status of at least one resource or at least one service, defining a rule for the acquisition of this status by this resource or by this service based on a status acquired by at least one other resource or service; and the analysis phase comprising:
configuring the analysis, comprising selecting a basic event, called a marked basic event;
analyzing the rules for the acquisition;
determining the set of basic events and conditions for the appearance thereof, leading to the appearance of the marked basic event, wherein the conditions for the appearance of basic events comprise conjunction, disjunction and negation logic operations between various basic events; and
associating at least some basic events with dysfunctions of the embedded system.

12. An analysis device for dysfunctions of an embedded system carrying out the analysis method according to claim 11.

13. A method for analyzing dysfunctions of an embedded system comprising a modeling phase for modeling the embedded system and an analysis phase, the modeling phase comprising:
defining a set of resources forming the embedded system, and for each defined resource, defining a set of services provided or consumed by this resource;
for each resource and for each service, defining a set of statuses, each status being able to be acquired by the corresponding resource or by the corresponding service to characterize the operating state of this resource or the quality of service of this service, the acquisition by a resource or by a service of one of the statuses from the corresponding set of statuses constituting a basic event; and
for each status of at least one resource or at least one service, defining a rule for the acquisition of this status by this resource or by this service based on a status acquired by at least one other resource or service; and the analysis phase comprising:
configuring the analysis, comprising selecting a basic event, called a marked basic event, based on an analysis domain of dysfunctions of the embedded system, each domain being chosen from the group consisting of:
diagnostic analysis domain, making it possible to identify the origin of appearance of an error message in the embedded system,
operating safety analysis domain, making it possible to analyze risks of the appearance of failure conditions,
safety analysis domain, making it possible to analyze consequences of the appearance of malevolent acts, and
operating warning analysis domain, making it possible to determine warnings indicating one or several dysfunctions of the embedded system;
analyzing the rules for the acquisition;
determining the set of basic events and conditions for the appearance thereof, leading to the appearance of the marked basic event; and
associating at least some basic events with dysfunctions of the embedded system.

14. An analysis device for dysfunctions of an embedded system carrying out the analysis method according to claim 13.

* * * * *